(12) United States Patent
Pettersson et al.

(10) Patent No.: US 10,402,890 B2
(45) Date of Patent: Sep. 3, 2019

(54) BOX-LAST PACKAGING SYSTEM, METHOD, AND COMPUTER PROGRAM PRODUCT

(71) Applicant: PACKSIZE LLC, Salt Lake City, UT (US)

(72) Inventors: Niklas Pettersson, Vasteras (SE); Chris R. Featherstone, Highland, UT (US); Clinton P. Smith, Highland, UT (US); Robert Lingstuyl, Salt Lake City, UT (US); Jeffrey Lee Rasmussen, West Jordan, UT (US)

(73) Assignee: Packsize LLC, Salt Lake City, UT (US)

( * ) Notice: Subject to any disclaimer, the term of this patent is extended or adjusted under 35 U.S.C. 154(b) by 826 days.

(21) Appl. No.: 14/502,980

(22) Filed: Sep. 30, 2014

(65) Prior Publication Data
US 2015/0019387 A1    Jan. 15, 2015

Related U.S. Application Data

(63) Continuation-in-part of application No. 14/370,738, filed as application No. PCT/US2013/020153 on Jan. 3, 2013, now Pat. No. 9,896,231.
(Continued)

(51) Int. Cl.
*G06Q 10/08* (2012.01)
*G06Q 30/06* (2012.01)
(Continued)

(52) U.S. Cl.
CPC ......... *G06Q 30/0635* (2013.01); *B65B 59/00* (2013.01); *B65C 1/00* (2013.01); *G06Q 10/08* (2013.01); *B65B 2210/04* (2013.01)

(58) Field of Classification Search
CPC ................. G06Q 30/0601–0645; G06Q 10/08
(Continued)

(56) References Cited

U.S. PATENT DOCUMENTS

| 4,656,591 A | 4/1987 | Goldberg |
| 5,265,398 A | 11/1993 | Van Alstine |

(Continued)

FOREIGN PATENT DOCUMENTS

| WO | 2011072253 | 6/2011 |
| WO | 2013106231 | 7/2013 |

(Continued)

OTHER PUBLICATIONS

Zhu, W. (2012). Algorithms for container loading problems (Order No. 3567210). Available from ProQuest Dissertations & Theses Global. (1420271003). Retrieved from https://search.proquest.com/docview/1420271003?accountid (Year: 2012).*

(Continued)

*Primary Examiner* — Abby J Flynn
*Assistant Examiner* — Arielle E Weiner
(74) *Attorney, Agent, or Firm* — Workman Nydegger

(57) ABSTRACT

Implementations of the present invention relate to systems and methods for receiving an order that has been gathered and is ready for packaging. After the order is received, a tracking code can be scanned. The tracking code may be associated with packaging information relating to the order's packaging attributes. A request can then be send to a packaging system to generate a packaging template. The packaging system can then generate the requested packaging template.

13 Claims, 9 Drawing Sheets

Related U.S. Application Data

(60) Provisional application No. 61/584,579, filed on Jan. 9, 2012.

(51) Int. Cl.
    *B65B 59/00*     (2006.01)
    *B65C 1/00*     (2006.01)

(58) Field of Classification Search
    USPC .................................. 705/26.1–27.2, 26.81
    See application file for complete search history.

(56) References Cited

U.S. PATENT DOCUMENTS

| | | | |
|---|---|---|---|
| 7,504,949 | B1 | 3/2009 | Rouaix et al. |
| 7,721,512 | B2 | 5/2010 | Stiegel |
| 7,810,724 | B2 | 10/2010 | Skaaksrud et al. |
| 8,086,344 | B1* | 12/2011 | Mishra ............... G06Q 30/0283 |
| | | | 700/214 |
| 8,406,917 | B2 | 3/2013 | Khan et al. |
| 8,560,406 | B1* | 10/2013 | Antony .................. G06Q 10/08 |
| | | | 705/28 |
| 8,560,461 | B1 | 10/2013 | Tian |
| 8,639,382 | B1 | 1/2014 | Clark et al. |
| 2001/0005968 | A1 | 7/2001 | Mills |
| 2004/0193466 | A1 | 9/2004 | Kull et al. |
| 2006/0242024 | A1* | 10/2006 | Mattingly ............... G06Q 30/02 |
| | | | 705/14.41 |
| 2008/0020916 | A1* | 1/2008 | Magnell .................... B65B 5/02 |
| | | | 493/65 |
| 2009/0313948 | A1 | 12/2009 | Buckley et al. |
| 2010/0087024 | A1* | 4/2010 | Hawat .................. B81B 7/0077 |
| | | | 438/51 |
| 2011/0153614 | A1* | 6/2011 | Solomon ................ B65G 1/127 |
| | | | 707/740 |
| 2013/0000252 | A1 | 1/2013 | Pettersson et al. |
| 2013/0247519 | A1* | 9/2013 | Clark ...................... B65B 57/00 |
| | | | 53/452 |
| 2013/0291493 | A1 | 11/2013 | Laudet |
| 2014/0038802 | A1* | 2/2014 | Clark ....................... B26D 5/00 |
| | | | 493/11 |
| 2015/0019387 | A1 | 1/2015 | Pettersson et al. |

FOREIGN PATENT DOCUMENTS

| | | |
|---|---|---|
| WO | 2013122999 | 8/2013 |
| WO | 2014118629 | 8/2014 |

OTHER PUBLICATIONS

International Search Report and Written Opinion for PCT/US2013/020153 dated May 15, 2013.
Packsize Understanding on Demand Packaging YouTube. Dec. 21, 2011 http://www.youtube.com/watch?feature=player_embedded&v=6iYmpRZycPQ.
International Search Report and Written Opinion for PCT/US2015/51933 dated Dec. 22, 2015.
European Search Report for EP13736159 dated Jun. 9, 2015.
European Search Report for EP13736159 dated Mar. 8, 2017.
"Packsize on Demand Packaging for the Furniture Industry—Company: Hunger—German" YouTube Oct. 26, 2011.
"Packsize Helps Leading Fulfilment Company Reduce Costs" YouTube Aug. 12, 2011.
"Packsize on Demand Packaging fur die Movelindustrie—Fa Ludewig" YouTube Oct. 27, 2011.
U.S. Appl. No. 14/370,738, Dec. 21, 2016, Office Action.
U.S. Appl. No. 14/370,738, Nov. 16, 2017, Notice of Allowance.
U.S. Appl. No. 14/370,738, Jul. 17, 2017, Office Action.
Extended European Search Report for EP15846645.8 dated Mar. 21, 2018.

* cited by examiner

BOX-LAST PACKAGING SYSTEM, METHOD, AND COMPUTER PROGRAM PRODUCT

CROSS-REFERENCE TO RELATED APPLICATIONS

This application is a continuation-in-part of U.S. patent application Ser. No. 14/370,738 filed on Jul. 3, 2014, entitled "PACKAGING STATION SYSTEM AND RELATED METHODS," which claims priority to and the benefit of PCT Application No. PCT/US2013/020153, filed Jan. 3, 2013, entitled "PACKAGING STATION SYSTEM AND RELATED METHODS", which claims the benefit of and priority to U.S. Provisional Application No. 61/584,579, filed Jan. 9, 2012, entitled "PACKAGING STATION SYSTEM AND RELATED METHODS". All the aforementioned applications are incorporated by reference herein in their entirety.

BACKGROUND

1. Technical Field

Exemplary embodiments of the invention relate to systems, methods, and devices for packaging orders.

2. Background and Relevant Art

Shipping and packaging industries frequently use paperboard and other fanfold material processing equipment that converts fanfold materials into box templates. One advantage of such equipment is that a shipper may prepare boxes of required sizes as needed in lieu of keeping a stock of standard, pre-made boxes of various sizes. Consequently, the shipper can eliminate the need to forecast its requirements for particular box sizes as well as to store pre-made boxes of standard sizes. Instead, the shipper may store one or more bales of fanfold material, which can be used to generate a variety of box sizes based on the specific box size requirements at the time of each shipment. This allows the shipper to reduce storage space normally required for periodically used shipping supplies as well as reduce the waste and costs associated with the inherently inaccurate process of forecasting box size requirements, as the items shipped and their respective dimensions vary from time to time.

In addition to reducing the inefficiencies associated with storing pre-made boxes of numerous sizes, creating custom sized boxes also reduces packaging and shipping costs. In the fulfillment industry it is estimated that shipped items are typically packaged in boxes that are about 40% larger than the shipped items. Boxes that are too large for a particular item are more expensive than a box that is custom sized for the item due to the cost of the excess material used to make the larger box. When an item is packaged in an oversized box, filling material (e.g., Styrofoam, foam peanuts, paper, air pillows, etc.) is often placed in the box to prevent the item from moving inside the box and to prevent the box from caving in when pressure is applied (e.g., when boxes are taped closed or stacked). These filling materials further increase the cost associated with packing an item in an oversized box.

Custom-sized boxes also reduce the shipping costs associated with shipping items compared to shipping the items in oversized boxes. A shipping vehicle filled with boxes that are 40% larger than the packaged items is much less cost efficient to operate than a shipping vehicle filled with boxes that are custom sized to fit the packaged items. In other words, a shipping vehicle filled with custom sized packages can carry a significantly larger number of packages, which can reduce the number of shipping vehicles required to ship that same number of items. Accordingly, in addition or as an alternative to calculating shipping prices based on the weight of a package, shipping prices are often affected by the size of the shipped package. Thus, reducing the size of an item's package can reduce the price of shipping the item.

Although sheet material processing machines and related equipment can potentially reduce inconveniences and costs associated with stocking and using standard sized shipping supplies, the process for making and using custom-made, just-in-time packaging templates can nevertheless be improved through the order in which the packaging templates are created and used.

BRIEF SUMMARY OF THE INVENTION

This disclosure relates to systems, methods, and devices for processing paperboard (such as corrugated cardboard) and similar fanfold materials and converting the same into packaging templates. In particular, embodiments described within the disclosure teach a picking and packaging systems where a custom packaging template is generated after an order has been completely gathered. Accordingly, in at least one embodiment, a custom-to-fit box can be requested and created on demand.

In at least one embodiment, a method for creating a packaging template after an order has been gathered can include receiving a first indication that a particular set of one or more ordered items has been gathered. The method can also include receiving a second indication associating the one or more ordered items with a particular packaging template. After receiving the first indication, the method can include requesting the particular packaging template from a packaging system. The method can then include creating the particular packaging template. The particular packaging template can be custom created by the packaging system to fit the particular set of one or more ordered items.

In yet another embodiment, a method for utilizing a converting machine in a packaging system for packaging orders can include receiving a first order that has been gathered and is ready for packaging. After receiving the first order, the method can include scanning a tracking code associated with the first order. The tracking code may be associated with packaging information relating to the first order's packaging attributes. The method can include sending a request to a packaging system to generate a packaging template. The packaging template may be associated with the first order after the first order has been gathered. Further, the method can include generating the packaging template. The packaging template can be custom made by the packaging system.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. For better understanding, like elements have been designated by like reference numbers throughout the various accompanying figures. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The embodiments described herein generally relate to systems, methods, and devices for processing paperboard (such as corrugated cardboard) and similar fanfold materials and converting the same into packaging templates. In particular, embodiments described within the disclosure teach a picking and packaging systems where a custom packaging template is generated after an order has been completely gathered. Accordingly, in at least one embodiment, a custom-to-fit box can be requested and created on demand.

Figure 1:
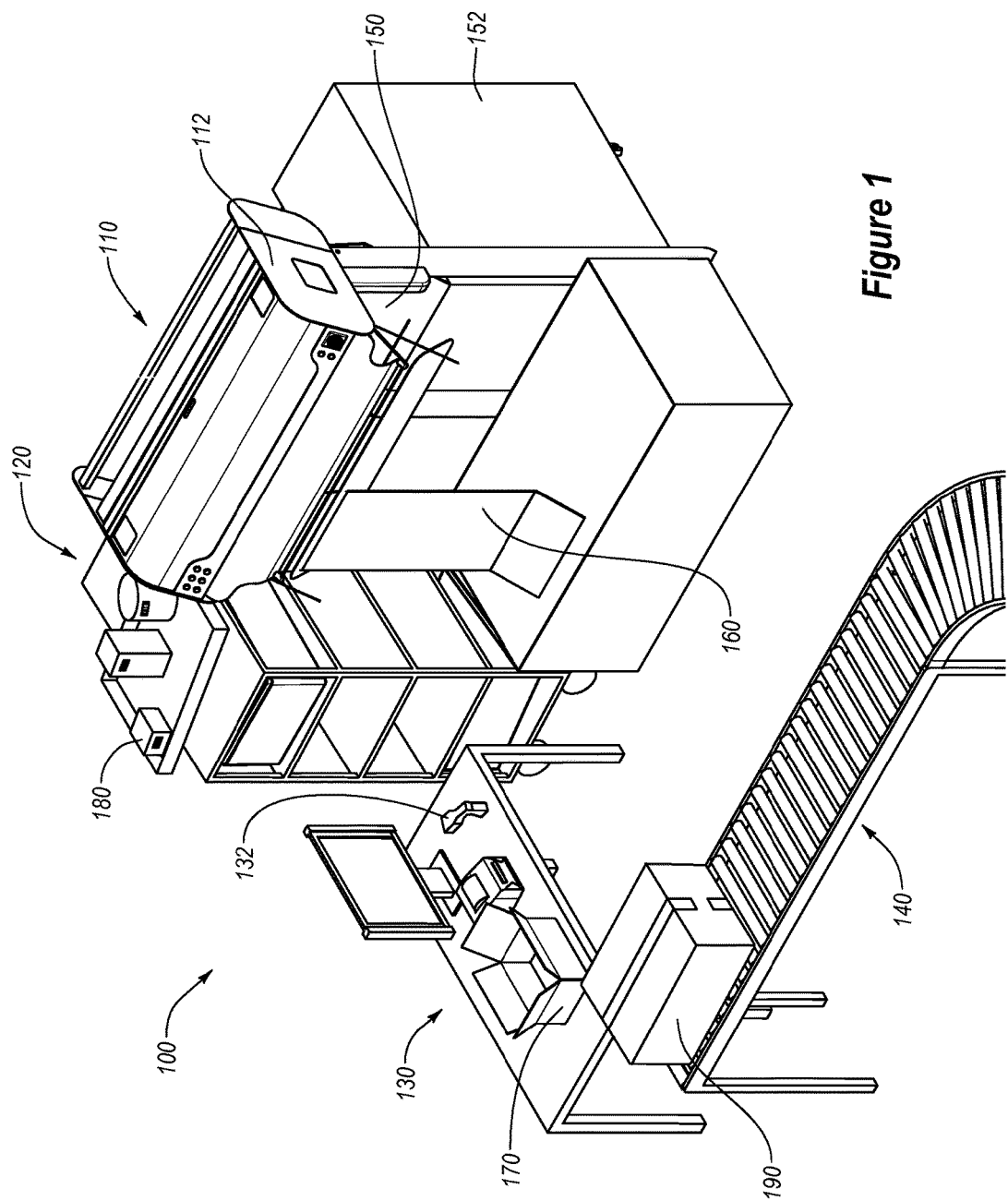
FIG. 1 illustrates a packaging cell as described in one aspect of this disclosure.

Generally, as illustrated in FIG. 1, a shipper can have one or more packaging cells 100, which can include equipment for packaging available orders and preparing the same for shipment. For example, the packaging cell 100 can include a packaging system 110, an available-order transport system 120, a work area 130, a tracking-code scanner 132, and a processed-order transport system 140. The packaging system 110 can include a converting machine 112 that can receive fanfold material 150 from one or more bales 152. The packaging system 110 can process the fanfold material 150 into packaging templates 160. An operator can retrieve the packaging templates 160 from the packaging system 110 and can form boxes 170 for shipment of available orders 180. As used herein, the term "available order" refers to any order (whether a single-item order or multi-item order) that can be processed as one unit by the shipper.

The available-order transport system 120 can transport various available orders 180 to the work area 130 for packaging and preparation for shipment. In some embodiments, the available-order transport system 120 can be a conveyor system or movable shelving system that can transport the available orders 180 to the work area 130. When the available orders 180 arrive at the work area 130, the operator can request packaging templates 160 to be prepared by the packaging system 110. In at least one embodiment, an operator requests the packaging templates 160 by scanning, with the tracking-code scanner 132, a code associated with each respective available-order 180. As further described below, such packaging templates 160 can be custom-sized based on the particular dimensions of the available orders 180 to be packaged.

In addition to packaging the available orders 180, the operator can prepare the available orders 180 for shipment by attaching required labels and other materials. Once the available order 180 is processed (i.e., packaged and/or prepared for shipment), such processed order 190 can be transported away from the work area 130 via the processed-order transport system 140. For instance, the processed-order transport system 140 can transport the processed orders 190 to a shipping area. In some implementations, the processed-order transport system 140 can be a conveyor belt that can connect the work area 130 and a desired location for the processed orders 190. In other embodiments, the processed-order transport system 140 can be a movable shelving system that can transport the processed orders 190 away from the work area 130.

Figure 2:
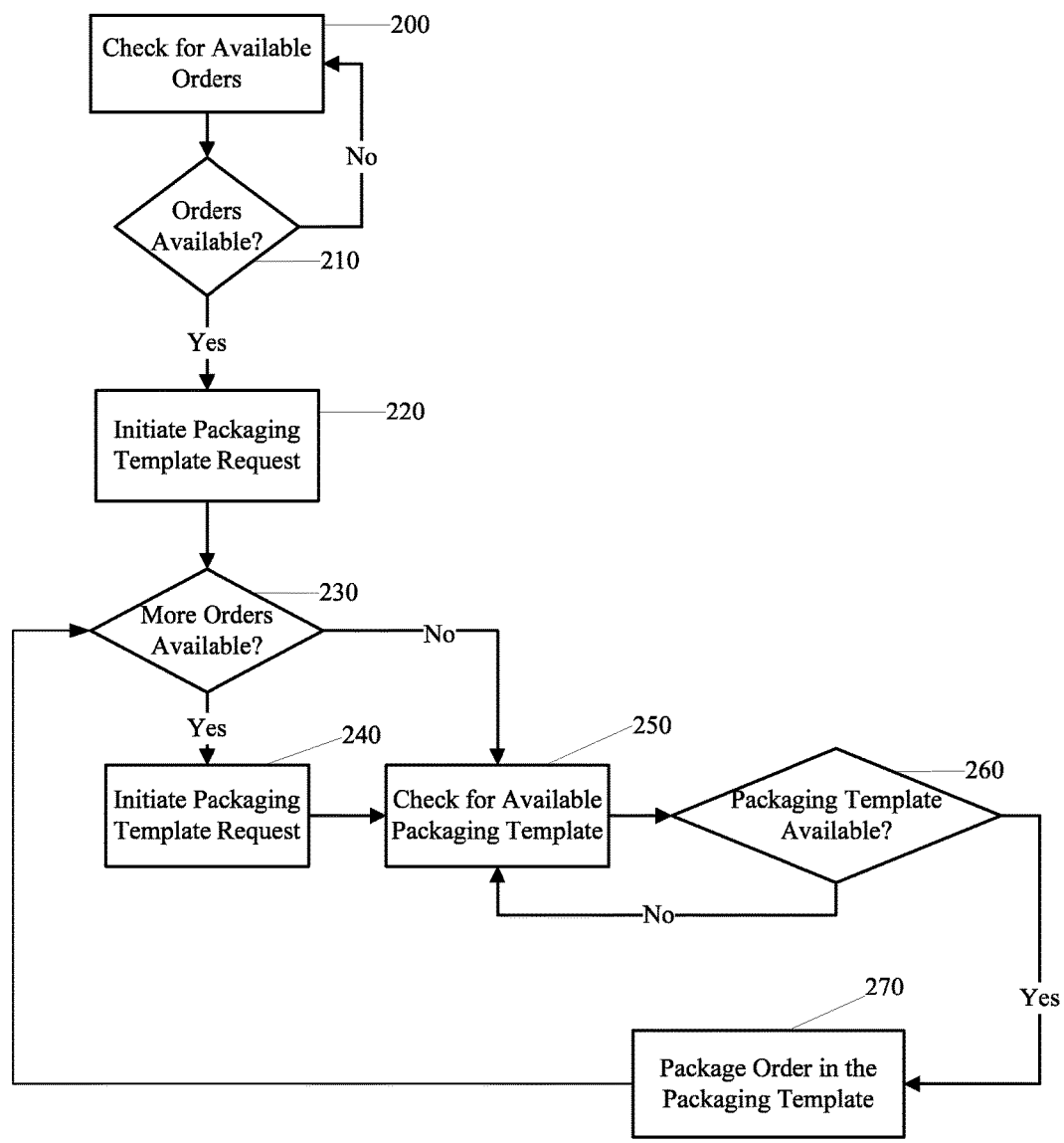
FIG. 2 illustrates a flow chart of an exemplary process for packaging multiple orders as described in one aspect of this disclosure.

As illustrated in FIG. 2, in some embodiments, to process available orders 180, a check is made for available orders 180 at step 200. If it is determined at step 210 that an available order 180 has arrived at the work area 130, a request is initiated at step 220 for the creation of a packaging template 160 for the available order identified in step 210. The process for initiating the request for the creation of a packaging template 160 is discussed in further detail below.

After initiating the request in step 220, it is determined in step 230 whether there is an additional available order 180 at the work area 130. If so, a request is initiated at step 240 for the creation of another packaging template 160 for the additional available order 180 identified in step 230. After initiating the request for the additional packaging template 160 identified in step 240, or when it is determined at step 230 that there is not an additional available order 180, a check is made in step 250 to determine whether the packaging system 110 has completed the creation of the packaging template for the initial order identified in step 210. If the requested packaging template 160 for the order identified in step 210 is available, as determined in step 260, the order identified in step 210 is packaged in step 270 using the packaging temple 160 requested in step 220. The packaging of an available order in a packaging template 160 is discussed in greater detail below.

After the initial available order identified in step 210 is packaged, the process returns to step 230 and cycles through again. Specifically, the process returns to step 230 to determine whether yet another available order 180 has arrived at the work area 130, in which case a request is initiated at step 240 for the creation of a packaging template 160 for the available order identified in the second occurrence of step 230. The process then moves to step 250 for the second time, where it is determined whether the packaging system 110 has completed the creation of the packaging template for the available order 180 identified during the first occurrence of step 230. If the requested packaging template 160 for the order identified in the first occurrence of step 230 is available, as determined in step 260, the order identified in the first occurrence of step 230 is packaged in step 270 using the packaging temple 160 requested in step 240.

The process illustrated in FIG. 2 can continue to cycle through steps 230-270 so long as there are additional orders at the work area 130 that need to be packaged. If no additional orders are identified in step 230, the orders that are already at the work area 130 and which have not been packaged may be packaged using the packaging templates 160 requested in connection therewith.

Figure 3:
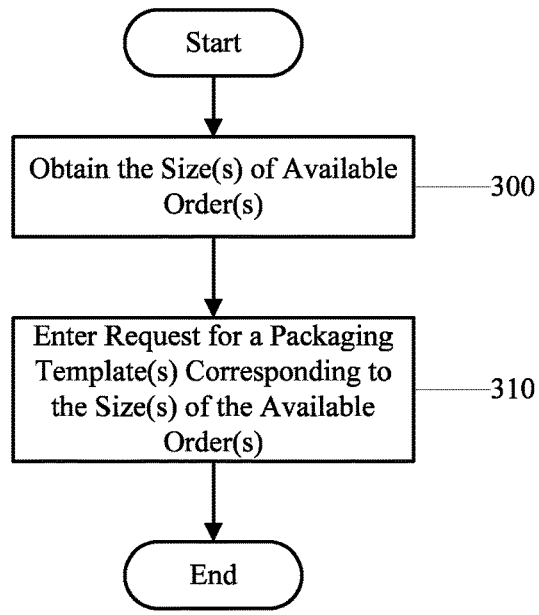
FIG. 3 illustrates a flow chart of exemplary sub-steps of the process shown in FIG. 2.

As described above, the packaging cell 100 can be operated in a manner that the packaging templates 160 are custom sized to the available orders 180 that arrive at the work area 130. As noted above, and as indicated in FIG. 2 at steps 220, 240, the packaging of available orders 180 in custom sized packages can begin by initiating a request for the creation of a custom sized packaging template 160. The initiation of the process can include multiple steps. As illustrated in FIG. 3, for example, initiation of the process can include obtaining the sizes of the available orders 180 (step 300) and requesting packaging templates 160 to be prepared based on the sizes of the available orders 180 (step 310).

For example, to obtain the sizes of the available orders 180, the available orders 180 can be measured, such as with a measuring tape, laser measuring device, or the like. Alternatively, the available order 180 can have a tracking number, such as a barcode, that can be associated with information related to the available order 180, including the size and/or shape of the available order, as well as other packaging requirements (e.g., needed padding). Thus, barcode can be scanned to obtain the size as well as other relevant parameters of the available order 180 (step 300). Furthermore, based on the obtained measurements and/or other information relating to the available order 180, a computer system can request a packaging template 160 be prepared by the packaging system 110 that corresponds to the size of the available order 180, as indicated in step 310.

Figure 4:
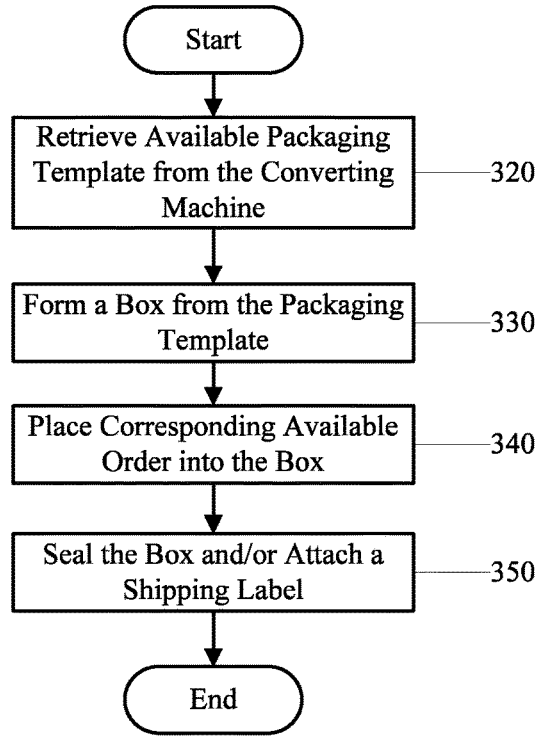
FIG. 4 illustrates yet another flow chart of exemplary sub-steps of the process shown in FIG. 2.

As described above, and as indicated in FIG. 2 at step 270, when the packaging template 160 is available, the packaging process can be completed by packaging the available order 180 using the packaging template 160 that corresponds to the available order 180. FIG. 4 illustrates exemplary steps is completing the packaging process for an available order. As shown, this portion of the packaging process can begin with retrieving the available packaging template 160 from the packaging system 110 (step 320). The retrieved packaging template 160 is then formed into a box 170 in step 330. In step 340, the available order 180 is placed in the box 170. Next, in step 350, the box 170 is closed and/or sealed and any needed labels, such as shipping labels, are placed on the box 170. Once the available order 180 is processed, the processed order 190 can be transported away from the work area 130 via the processed-order transport system 140.

Figure 5:
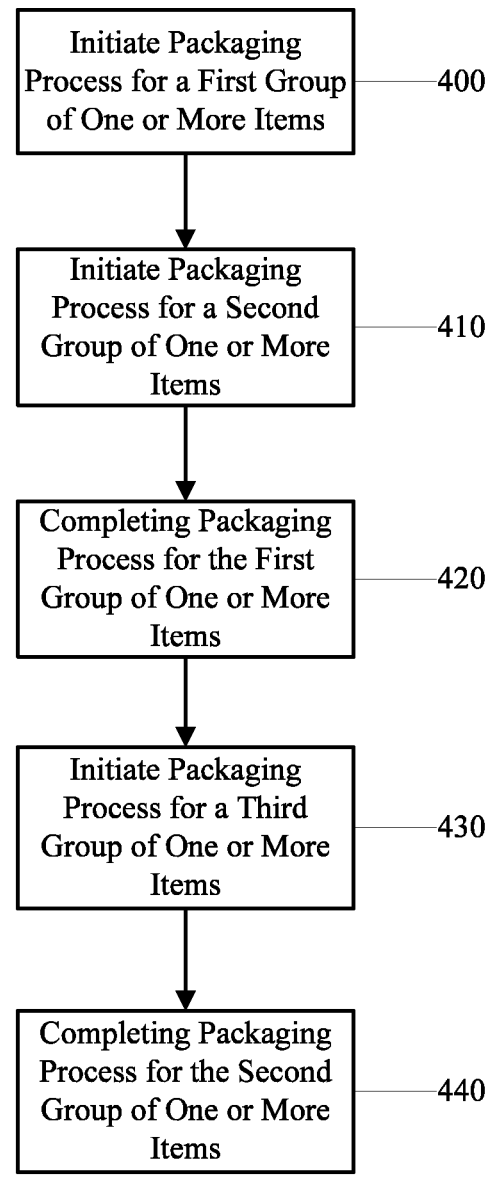
FIG. 5 illustrates a flow chart of an exemplary process for packaging multiple groups of one or more items as described in one aspect of this disclosure.

In some embodiments, as illustrated in FIG. 5, the packaging process can be initiated in step 400 for a first group of one or more items from the available orders 180. The initiation of the packaging process may be similar or identical to that shown in and discussed in connection with FIG. 3. As used herein, the term "items" refers to any item that is individually identifiable within an available order. For example, an order may comprise two items that can be packaged in the same or in two separate boxes, depending on the shipper's preferences. In addition to the above description, initiating the packaging process also can include creating the packaging template 160, which can be assembled into the box 170, custom-sized for one or more available orders 180 or for one or more items within one or more of the available orders 180.

After initiating the packaging process for the first group of items, the packaging process for a second group of one or more items from the available orders 180 can be initiated in step 410. Subsequently, the packaging process for the first group of one or more items can be completed in step 420. As described above, completing the packaging process can include packaging the items or the available orders 180 within the box 170. Thereafter, the packaging process for a third group of one or more items from the available orders 180 can be initiated in step 430. After initiated the packaging process for the third group of items, the packaging process for the second group of one or more items from the available orders 180 can be completed in step 440.

While not illustrated, the packaging process can continue for any number of groups of items in the same manner as described above. For instance, the packaging process for a fourth group of one or more items from the available orders 180 can be initiated, after which the packaging process for the third group of one or more items can be completed.

Figure 6:
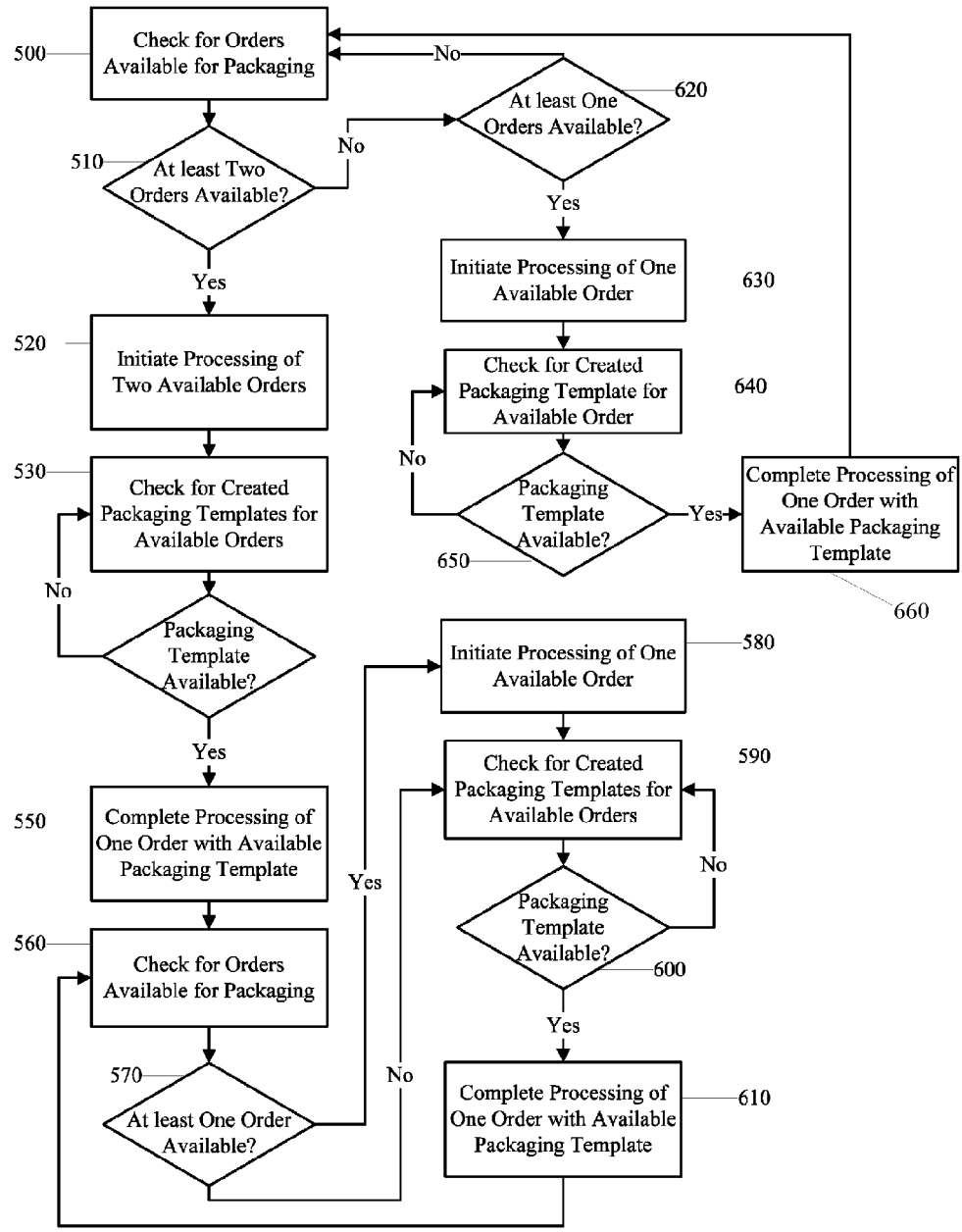
FIG. 6 illustrates a flow chart of another exemplary process for packaging multiple groups of one or more items as described in one aspect of this disclosure.

Additionally or alternatively, as illustrated in FIG. 6, the operator can check whether there are available orders 180 within the packaging cell 100 (step 500). If there are at least two available orders 180 within the packaging cell 100 (step 510), the operator can initiate the processing of two available orders 180 (step 520), as described above. Subsequently, the operator can check whether the packaging system 110 prepared packaging templates 160 for at least one of the initiated orders (step 530). If at least one packaging template 160 is available, the operator can complete the processing of one of the available orders 180 (step 550), as described above.

After completing processing of one of the available orders 180, the operator can check whether additional available orders 180 are present within the packaging cell 100 (step 560). If at least one available order 180 is present within the packaging cell 100 (step 570), the operator can initiate the packaging process for one of the additional available orders 180 (step 580). Subsequently, the operator can check whether the packaging system 110 has prepared at least one packaging template 160, which can be used to package one of the available orders 180 (steps 590, 600). If there is at least one packaging template 160 that is available for packaging at least one of the available orders 180, the operator can complete the processing of the available order 180 that corresponds with the available packaging template 160 (step 610). After completing the step 610, the operator can check whether additional available orders 180 are present within the packaging cell 100 (step 560).

If at the outset of the process there is only one available order 180 within the packaging cell 100 (steps 500, 510, 620), the operator can initiate processing of the one available order 180 (step 630). Subsequently, the operator can check whether the packaging template 160 has been prepared for the available order 180 (step 640) and, if the packaging template 160 is available (step 650), the operator can complete processing of the order (step 660). After the operator has completed the order (step 660), the operator can once again check for more available orders (step 500).

Figure 7:
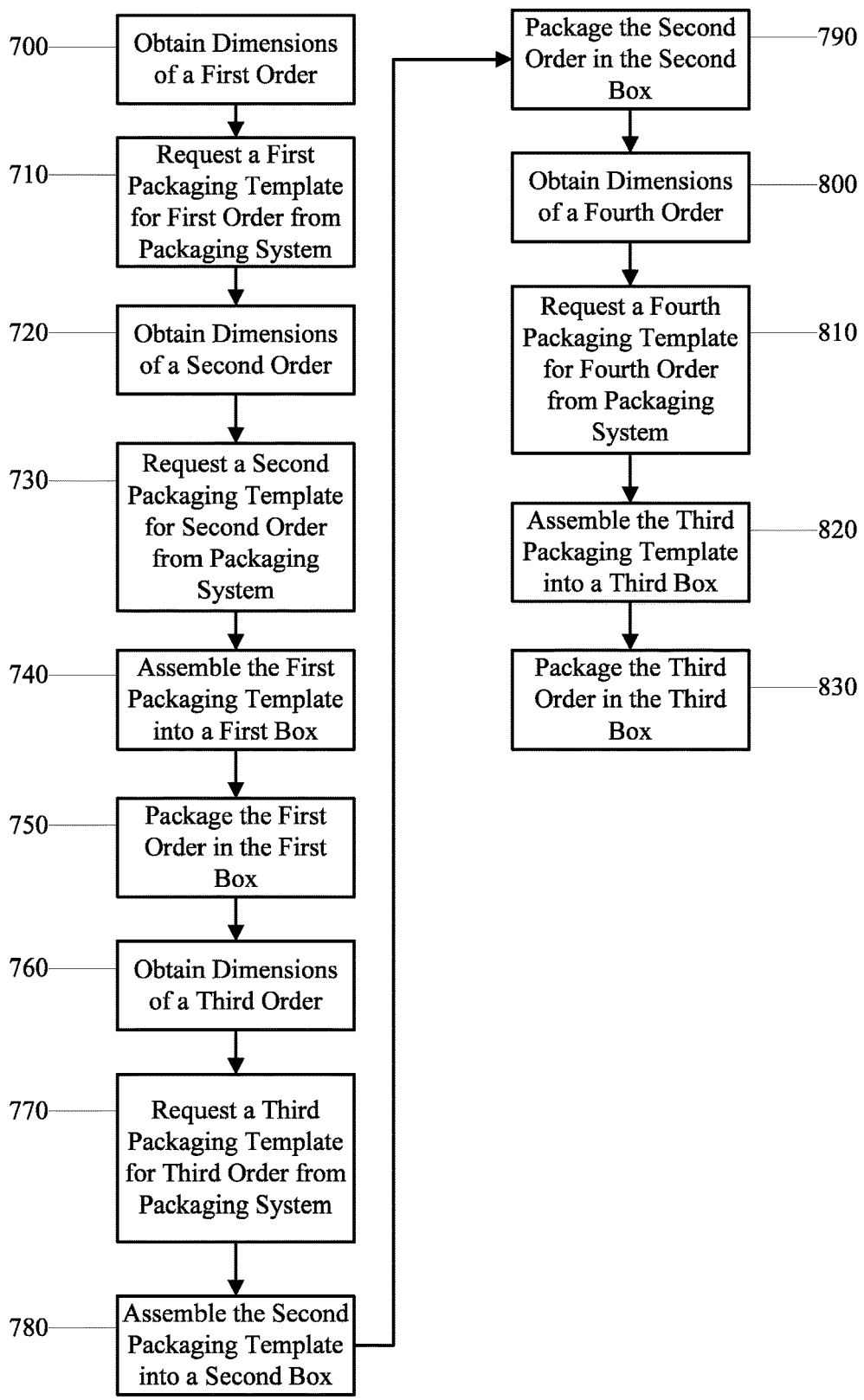
FIG. 7 illustrates a flow chart of still another exemplary process for packaging orders as described in one aspect of this disclosure.

In yet another embodiment, as illustrated in FIG. 7, the operator can obtain dimensions of a first available order 180 (step 700), as described above. Subsequently, the operator can request a first packaging template 160 from the packaging system 110 for packaging the first available order 180 (step 710). After requesting the first packaging template 160, the operator can obtain dimensions of a second available order 180 (step 720) and can request a second packaging template 160 for the second available order 180 (step 730).

After requesting the second packaging template 160, the operator can assemble the first packaging template 160 into a first box 170 (step 740) and can package the first available order 180 in the first box 170 (step 750). Subsequently, the operator also can obtain dimensions of a third available order 180 (step 760) and can request a third packaging template 160 from the packaging system 110 for packaging the third available order 180 (step 770). After requesting the third packaging template 160, the operator can assemble the second packaging template 160 into a second box 170 (step 780) and can package the second available order 180 in the second box 170 (step 790).

After completing the step 790, the operator also can obtain dimensions of a fourth available order 180 (step 800) and can request a fourth packaging template 160 from the packaging system 110 for packaging the fourth available order 180 (step 810). After requesting the fourth packaging template 160, the operator can assemble the third packaging template 160 into a third box 170 (step 820) and can package the third available order 180 in the third box 170 (step 830).

Furthermore, the operator can continue to operate within the packaging cell 100 in the same manner as described above. For instance, the operator can obtain dimensions of a fifth available order 180 and can request a fifth packaging template 160 from the packaging system 110 for packaging the fifth available order 180. The operator also can assemble the fourth packaging template 160 into a fourth box 170 and can package the fourth available order 180 in the fourth box 170, and so on.

In light of this disclosure, those skilled in the art should appreciate various methods of packaging that can be used in conjunction with the methods and systems described herein. For instance, the operator can assemble the packaging templates 160 into boxes 170 by securing various portions of the packaging templates 160 with an adhesive tape or staples. Additionally or alternatively, one operator can assembly the packaging templates 160 into boxes 170 and place the available orders 180 into the assembled boxes 170, and another operator can secure various portions of the boxes 170 with an adhesive tape.

Figure 8:
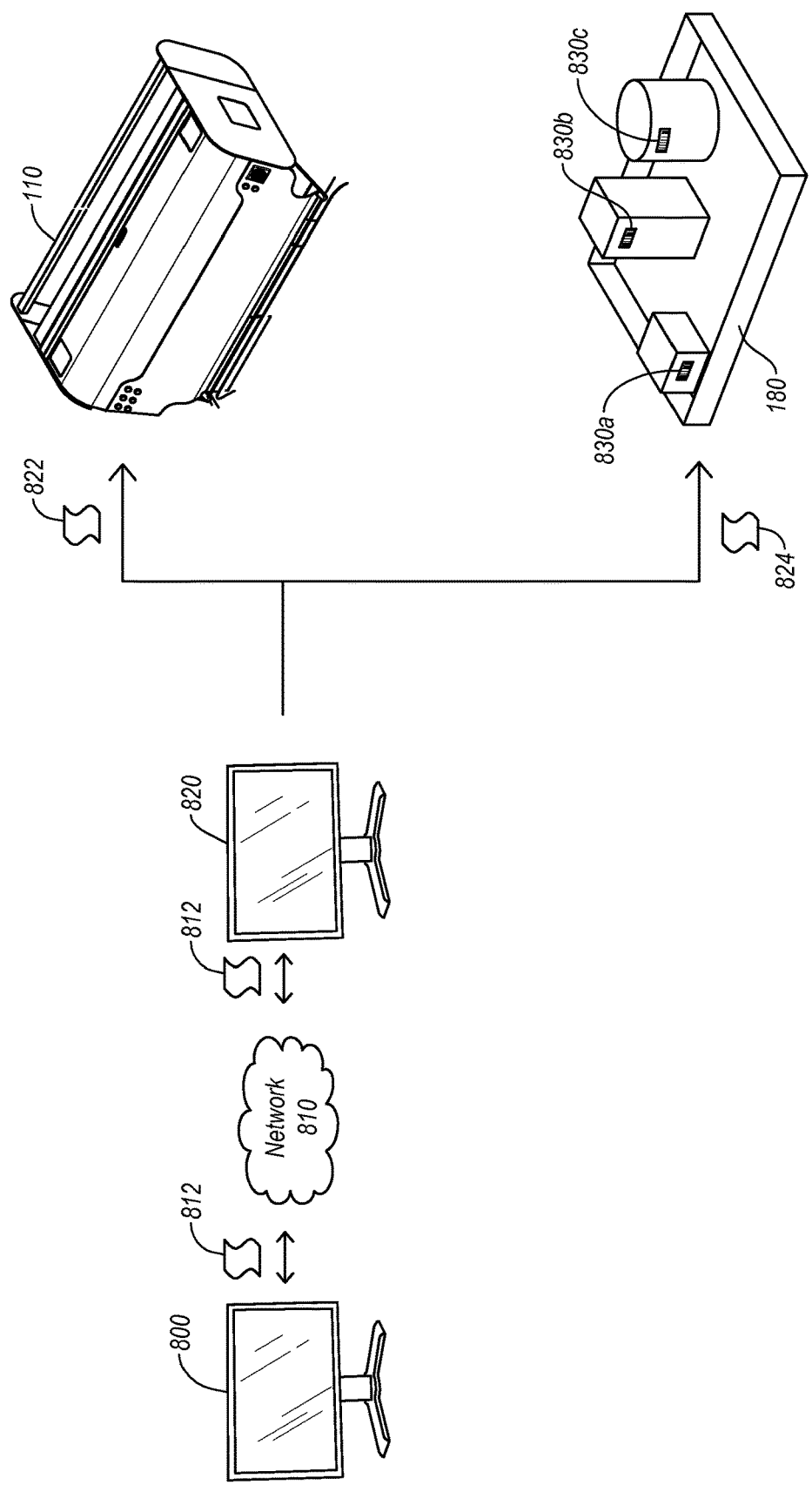
FIG. 8 illustrates a schematic diagram of an embodiment of an order fulfillment system.

FIG. 8 illustrates a schematic diagram of an embodiment of an order fulfillment system. In particular, the diagram includes a customer computer console 800 in communication through a network 810 (e.g., the Internet) with a fulfillment computer 820. One will understand that while conventional desktop computers are depicted, in practice the costumer computer console 800 and/or the fulfillment computer 820 can also comprise servers, mobile computing devices, laptops, tablet computers, workstations, or any other computing device capable of communicating over a network 810.

A customer can use the customer computer console 800 to submit an online order 812. The online order can comprise a single ordered item, a set of ordered items, or a variety of unrelated items. In an alternative embodiment, the order 812 can be submitted via standard mail, phone, in-person, or through any other conventional means.

Once the fulfillment computer 820 receives the order 812, the fulfillment computer 820 can generate a picking request 824 for the ordered items. The picking request 824 can be sent to an automated picking system that comprises moving shelves, autonomous robotics, semi-autonomous robotics, conveyor belts, auto-pickers, and/or any other conventional automated picking system component. In at least one embodiment, the picking request 824 can be sent to human pickers.

The fulfillment computer 820 can comprise a variety of different user interfaces. For example, the fulfillment computer 820 can receive from a user a CSV drop file used to ingress carton data from a WMS (Warehouse Management System). Additionally, the fulfillment computer 820 can communicate with a tracking code scanner 132. The tracking code scanner 132 can be used to trigger the creation of the appropriate packaging template. The scanner can be configured within the fulfillment computer 820. In at least one implementation, the port used to communicate to the tracking-code scanner 132 maps back internally to a "Production Group". The production group can comprise machine location as well as the number of machines used to fulfill the request.

The picking request 824 can provide information regarding the requested item or items. For example, the picking request 824 can provide information about the location of the items within a warehouse, the number of items requested, any specific attributes of the requested item, and/or any other useful picking information. Additionally, in at least one implementation, the picking request 824 can comprise labeling information for an order.

The labeling information can comprise printable labels that are to be attached to each order and/or each item within the order. FIG. 8 depicts labels 830(*a-c*) attached to each item within the order. In contrast, in at least one implementation, a single order label can be printed and associated with the entire order. For example, the label may be attached to a tote or container that the order items are placed within during picking. In at least one implementation, the labels are unique to each item, such that each item comprises a unique tracking code.

Additionally, in at least one embodiment, each of the tracking labels associates the entire order with a packaging template. For example, each label 830(*a-c*) may indicate that the order should be associated with a particular packaging template, type of packaging template, or size of packaging template. Accordingly, in at least one embodiment, scanning any of the labels 830(*a-c*) will indicate the packaging template that the order should be associated with.

In at least one embodiment, in addition to generating a picking request 824, the fulfillment computer 820 also generates a packaging template request 822. The fulfillment computer 820 can generate the packaging template request 822 by calculating the optimal dimensions of a box that would fit the ordered items. In at least one embodiment, determining the optimal dimensions comprises determining box dimensions that will allow all of the ordered items to fit while reducing excess space within the box. Additionally, in at least one implementation, determining the optimal dimensions may be constrained by packaging parameters and machine capabilities. For example, packaging parameters may require that the box comprise rectangular sides. Additionally, in at least one embodiment, the packaging template may be limited to a selection of predetermined templates. Each of the pre-determined templates, however, may comprise variable dimensions, such that each pre-determined template can be custom sized to a particular order.

In at least one implementation, packaging templates are stored as an xml document. Additionally, in at least one implementation, a user can leverage another piece of software to custom design the packaging template to meet the user's needs. Once complete, the packaging template can be loaded into the server and made available for production.

When a particular packaging template is requested for production the xml document can be converted into an internal format used to represent machine movements. The internal representation is then sent to the machine for production.

In addition to comprising packaging template dimensions, a packaging template request 822 can also specify the type and/or thickness of corrugate that should be used to create the requested packaging template. The fulfillment computer 820 can determine the type and/or thickness of corrugate by accounting for the weight of the ordered items, the size of the ordered items, the shape of the ordered items, and other similar attributes.

As shown in FIG. 8, in at least one implementation, the packaging template request 822 can be sent directly to the packaging system 110. As mentioned above, the packaging template request can be associated with one or more tracking labels 830(*a-c*). In at least one embodiment, the packaging template request may not be processed until a corresponding tracking label 830(*a-c*) is read and the packaging system 110 is activated.

In contrast, in at least one embodiment, the packaging template request 822 can be integrated into the tracking labels 830(*a-c*). For example, a tracking label 830(*a-c*) can comprise a serial number that is associated with a particular type of packaging template—where a particular type of packaging template comprises a pre-determined template as described above. The tracking label 830(*a-c*) can further comprise specific dimensions for the requested type of packaging template. In contrast, in at least one embodiment, the tracking label 830(*a-c*) can comprise dimensions for the items within the order, such that the final dimensions of the requested tracking template are determined by the packaging system 110.

Once the picking request 824 has been completed and the order 180 is available for packaging, an operator can scan a tracking label 830(*a-c*). As mentioned above, in at least one implementation, the operator can scan any tracking label 830(*a-c*) on any ordered item. The tracking label 830(*a-c*) can indicate to the packaging system the particular packaging template that should be generated.

In the case that the packaging template request 822 was sent to the packaging system 110 by the fulfillment computer 820, the tracking label 830(*a-c*) can comprise a code that associates itself with the previously delivered packaging template request 822. In contrast, in the case that the packaging template request 822 is incorporated into the tracking label 830(*a-c*), the packaging system 110 can extract the information and use the information to generate a packaging template using the methods described above. In at least one implementation, the information used to associate a tracking label with a particular packaging template is runtime data and is persisted in memory during normal production. In the case of a failure in the system, the data can also be persisted in postgres database.

Accordingly, in at least one embodiment, the packaging system 110 associates an available order 180 with a particular packaging template 160 only after the available order has been picked and is ready for packaging. While, a packaging template request 822 may be associated with an order at an earlier point, the packaging template request is not processed by the packaging system 110 until the order is complete and ready for shipping.

Accordingly, FIGS. 1-8 and the corresponding text illustrate or otherwise describe one or more components, modules, and/or mechanisms for creating packaging templates and associating the packaging template with orders. In particular, in at least one implementation, the packaging system can generate a packaging template for an available order, after the order has been completely gathered and is ready for shipping. One will appreciate that implementations of the present invention can also be described in terms of flowcharts comprising one or more acts for accomplishing a particular result. For example, FIGS. 9 and 10 and the corresponding text describe acts in a method for creating packaging templates. The acts of FIGS. 9 and 10 are described below with reference to the elements shown in FIGS. 1-8.

Figure 9:
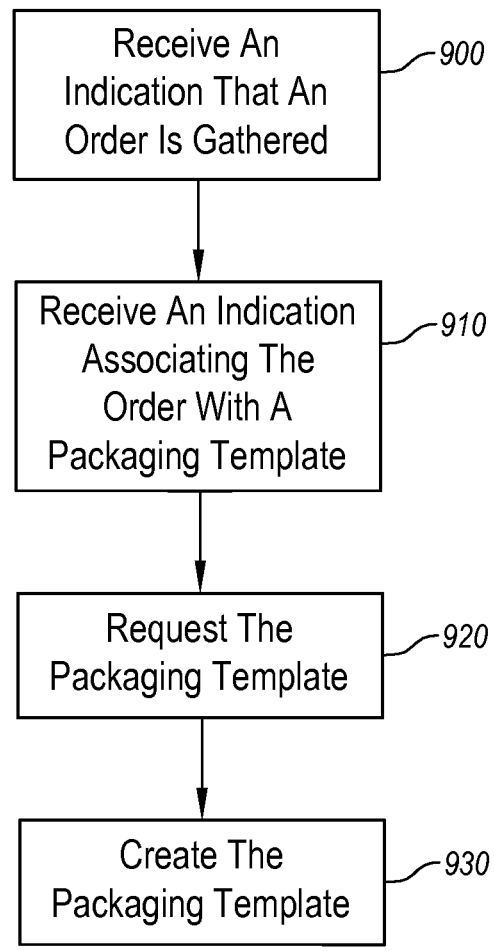
FIG. 9 illustrates a flow chart of still another exemplary process for packaging orders as described in one aspect of this disclosure.
Figure 10:
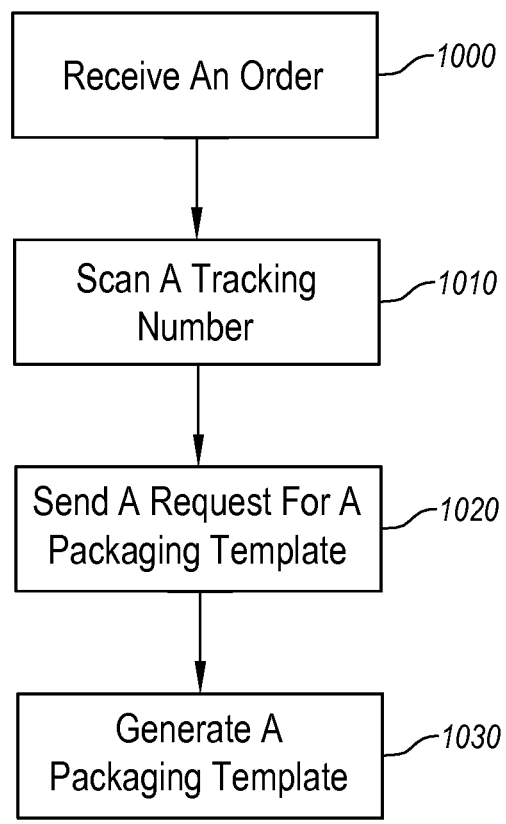
FIG. 10 illustrates a flow chart of yet another exemplary process for packaging orders as described in one aspect of this disclosure.

For example, FIG. 9 illustrates that a method for creating a packaging template after an order has been gathered can include an act 900 of receiving an indication that an order is gathered. Act 900 can comprise receiving a first indication that a particular set of one or more ordered items has been gathered. For example, as shown in FIG. 1, an available order 180 is placed within available-order transport system 120 once the entire order has been gathered.

Additionally, FIG. 9 shows that the method can include an act 910 of receiving an indication associating the order with a packaging template. Act 910 can include receiving a second indication associating the one or more ordered items with a particular packaging template. For example, FIGS. 1 and 8, and the accompanying description, describe a particular packaging template 160 being associated with an available order when an operator scans a tracking label 830(*a-c*) with a tracking-code scanner 132. Once the tracking label 830(*a-c*) is scanned, in at least one embodiment, the packaging system can associate the available order 180 with a packaging template request 822 that was previously sent to the packaging system 110, or the packaging system 110 can generate a packaging template request 822 based upon information within the tracking label 830(*a-c*).

FIG. 9 shows that the method can also include act 920 of requesting the packaging template. Act 920 can include, after receiving the first indication, requesting the particular packaging template from a packaging system. For example, in FIGS. 1 and 8, and the accompanying description, a packaging template is requested from the packaging system 110 after the order has been completely gathered.

Further, FIG. 9 shows that the method can include act 930 of creating the packaging template. Act 930 can comprise creating the particular packaging template, wherein the particular packaging template is custom created by the packaging system to fit the particular set of one or more ordered items. For example, FIG. 1 shows a packaging template 160 being created by a packaging system 110. In at least one embodiment, the packaging system 110 can create custom fit packaging templates.

In addition to the method depicted in FIG. 9, FIG. 10 illustrates that a method for utilizing a converting machine in a packaging system for packaging orders can include an act 1000 of receiving an order. Act 1000 can comprise receiving a first order that has been gathered and is ready for packaging. For example, as shown in FIG. 1, an available order 180 is placed within available-order transport system 120 once the entire order has been gathered.

Additionally, FIG. 10 shows that the method can include an act 1010 of scanning a tracking number. Act 1010 can include, after receiving the first order, scanning a tracking number associated with the first order, wherein the tracking number is associated with packaging information relating to the first order's packaging attribute. For example, FIGS. 1 and 8, and the accompanying description, describe a particular packaging template 160 being associated with an available order when an operator scans a tracking label 830(a-c) with a tracking-code scanner 132. Once the tracking label 830(a-c) is scanned, in at least one embodiment, the packaging system can associate the available order 180 with a packaging template request 822 that was previously sent to the packaging system 110, or the packaging system 110 can generate a packaging template request 822 based upon information within the tracking label 830(a-c).

FIG. 10 shows that the method can also include act 1020 of sending a request for a packaging template. Act 1020 can include sending a request to a packaging system to generate a packaging template. The packaging template can be associated with the first order after the first order has been gathered. For example, in FIGS. 1 and 8, and the accompanying description, a packaging template is requested from the packaging system 110 after the order has been completely gathered.

Further, FIG. 10 shows that the method can include act 1030 of generating a packaging template. Act 1030 can comprise generating the packaging template, wherein the packaging template is custom made by the packaging system. For example, FIG. 1 shows a packaging template 160 being created but a packaging system 110. In at least one embodiment, the packaging system 110 can create custom fit packaging templates.

In at least one embodiment, associating an available order 180 with a particular packaging template 160 after the order is complete and ready for packaging provides significant benefits within the art. For example, many conventional picking systems utilize totes or bins to pick order items. This is in contrast to other convention systems where the actual shipping box is used during the picking process. Accordingly, in at least one implementation, the order items are not ready for a box until the picking process has completed. In this embodiment, manufacturing large numbers of boxes prior to the order being ready can monopolize significant amounts of valuable warehouse space. As such, implementations of the present invention can save significant costs by only generating packaging templates when the order is ready to be shipped.

Additionally, in some conventional systems using the shipping boxes during the picking process can result in damage to the shipping boxes themselves. For example, before being filled with ordered items, shipping boxes can be easily jostled and overturned which can cause edges and flaps of the boxes to catch within machinery and tear or crumple. Similarly, in some conventional picking systems, boxes can be damaged during normal picking operations. For example, a box may be smashed between two larger and heavy boxes. Accordingly, implementations of the present invention provide significant benefits for protecting shipping boxes during the fulfillment process.

Further, in at least one embodiment of the present invention, creating the box after an order is ready for packaging and shipping can aid an operator in packing a particular box. For example, in conventional systems when a box is created first, during the picking process it may not be clear the most efficient way to pack a box. This may be particularly true when the ordered items are of drastically different sizes and shapes. This may also be particularly true when the operator is attempting the pack a custom box that has been sized-to-fit the order. In this case, there may be less room for error in how the box is packed. Accordingly, embodiments of the present invention that allow an operator to account for every ordered item before beginning to pack a box can provide significant benefit. For instance, an operator may be able to quickly identify which of the ordered items should be packed first and which should be packed last.

Accordingly, embodiments of the present invention can utilize methods, systems, computer-readable media, and other computer-based implementations to improve the technical field of packaging template generation and management. In particular, implementations of the present invention allow an operator to generate a custom sized box on demand once an order has been gathered.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud-computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Some embodiments, such as a cloud-computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for creating a packaging template after an order has been gathered, comprising:
   one or more processors, and
   one or more computer-readable media having stored thereon executable instructions that when executed by the one or more processors configure the computer system to perform at least the following:
   receive a first order for a group of items, including at least a first item and a second item;
   generate first dimensions for a first box associated with a first packaging template type, the first packaging template type sized and configured to hold the group of items, including at least the first item and the second item;
   print a first tracking label to be associated with the first item within the first order, wherein the first tracking label comprises:
   a serial number associated with the first packaging template type, wherein the first packaging template type comprises a pre-determined template type that is associated with variable dimensions,
   the generated first dimensions for the first packaging template type, wherein the generated first dimensions were generated after receipt of the first order, and
   an indication that the first item is to be packaged within the first box created from the first packaging template type;
   print a second tracking label to be associated with the second item within the first order, wherein the second tracking label comprises:
   the serial number associated with the first packaging template type,
   the generated first dimensions for the first packaging template type, wherein the generated first dimensions were generated after receipt of the first order, and
   an indication that the second item is to be packaged within the first box created from the first packaging template type;
   receive, from a tracking code scanner, a first indication that the first tracking label has been scanned;
   after receiving the first indication, send a request to a packaging system to construct a particular packaging template of the first packaging template type using the generated first dimensions; and
   create the particular packaging template after receiving the first indication, wherein the particular packaging template is custom created by the packaging system to fit at least the first item and the second item.

2. The system of claim 1, wherein the executable instructions include instructions that are executable to configure the computer system to apply one or more tracking labels to a set of one or more ordered items.

3. The system of claim 2, wherein the executable instructions include instructions that are executable to configure the computer system to apply tracking labels to each ordered item within the set of one or more ordered items.

4. The system of claim 3, wherein each of the tracking labels associates the order with the particular packaging template.

5. The system of claim 4, wherein requesting the particular packaging template from a packaging system comprises scanning any one of the tracking labels.

6. The system of claim 2, wherein the executable instructions include instructions that are executable to configure the computer system to apply a single tracking label to the entire set of the set of one or more ordered items.

7. The system of claim 6, wherein requesting the particular packaging template from a packaging system comprises scanning the single tracking label.

8. The system of claim 1, wherein first item and the second item are gathered within a tote.

9. The system of claim 1, wherein the packaging template is selected from a collection of pre-generated packaging templates.

10. A method for utilizing a converting machine in a packaging system for packaging orders, the method comprising:
 receiving a first order for a group of items, including at least a first item and a second item;
 generating first dimensions for a first box associated with a first packaging template type, the first packaging template type sized and configured to hold the group of items, including at least the first item and the second item;
 receiving, with a computer processor, the first order that has been gathered and is ready for packaging, the first order comprising the first item that is associated with a first tracking label and the second item that is associated with a second tracking label, wherein:
 the first tracking label comprises:
 a serial number associated with the first packaging template type, the generated first dimensions for the first packaging template type, wherein the generated first dimensions were generated after receipt of the first order, and
 an indication that the first item is to be packaged within the first box created from the first packaging template type, and the second tracking label comprises:
 the serial number associated with the first packaging template type,
 the generated first dimensions for the first packaging template type, wherein the generated first dimensions were generated after receipt of the first order, and
 an indication that the second item is to be packaged within the first box created from the first packaging template type;
 after receiving the first order, scanning, with the computer processor, the first tracking label that is associated with the first item;
 sending, with the computer processor, a request to a packaging system to generate a particular packaging template, wherein:
 the particular packaging template is based upon the first packaging template type using the generated first dimensions, and
 the particular packaging template is associated with the first order after the first order has been gathered; and
 after scanning the first tracking label, generating, with the computer processor, the particular packaging template.

11. The method of claim 10, wherein the first packaging template is selected from a collection of pre-generated packaging templates.

12. The method of claim 11, wherein the pre-generated packaging templates comprise adjustable dimensions that are custom sized to package the first order.

13. A computer program product comprising one or more non-transitory computer storage media having stored thereon computer-executable instructions that, when executed at a processor, cause a computer system to perform a method for creating a packaging template after an order has been gathered, the method comprising:
 receiving a first order for a group of items, including at least a first item and a second item;
 generating first dimensions for a first box associated with a first packaging template type, the first packaging template type sized and configured to hold the group of items, including at least the first item and the second item;
 printing a first tracking label to be associated with the first item within the first order, wherein the first tracking label comprises:
 a serial number associated with the first packaging template type,
 the generated first dimensions for the first packaging template type, wherein the generated first dimensions were generated after receipt of the first order, and
 an indication that the first item is to be packaged within the first box created from the first packaging template type;
 printing a second tracking label to be associated with the second item within the first order, wherein the second tracking label comprises:
 the serial number associated with the first packaging template type,
 the generated first dimensions for the first packaging template type, wherein the generated first dimensions were generated after receipt of the first order, and
 indication that the second item is to be packaged within the first box created from the first packaging template type;
 receiving, from a tracking code scanner, a first indication that the first tracking label has been scanned;
 after receiving the first indication, send a request to a packaging system to construct a particular packaging template of the first packaging template type using the generated first dimensions, wherein the packaging template is custom created by the packaging system.

* * * * *